Figure 1:
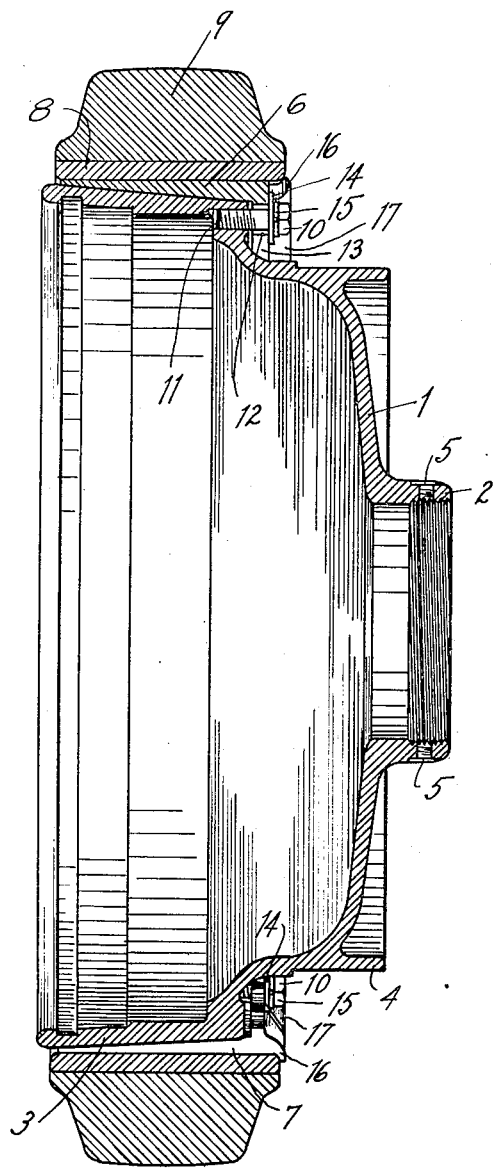

Dec. 19, 1922.
K. KNUDSEN.
TIRE SECURING MEANS.
ORIGINAL FILED JULY 29, 1919.

1,439,424.

WITNESS:
C. C. West.

INVENTOR.
Karsten Knudsen
BY
Frank A. Cutter,
ATTORNEY.

Patented Dec. 19, 1922.

1,439,424

UNITED STATES PATENT OFFICE.

KARSTEN KNUDSEN, OF GRAND RAPIDS, MICHIGAN, ASSIGNOR TO ELECTRIC WHEEL CO., ASSOCIATES, OF SPRINGFIELD, MASSACHUSETTS.

TIRE SECURING MEANS.

Original application filed July 29, 1919, Serial No. 314,081. Divided and this application filed July 21, 1920. Serial No. 397,866.

*To all whom it may concern:*

Be it known that I, KARSTEN KNUDSEN, a citizen of the United States of America, and a resident of Grand Rapids, in the county of Kent and State of Michigan, have invented new and useful Tire-Securing Means, of which the following is a specification.

My invention relates to improvements in wheels in which the motive power is within, such as the electric-motor wheels for transportation and other vehicles of a more or less similar character, and more particularly to means for securing the tires to such wheels, said invention being a divisional part of my application for United States Letters Patent, Serial No. 314,081, now Patent 1,366,083, Jan. 18, 1921.

The aforesaid improvements reside in the parts and combinations of parts as hereinafter more fully set forth.

It has heretofore been the practice, in the construction of wheels of the aforesaid type, to press the tire on to the band or rim of the wheel. It is necessary that the tire fit the wheel rim tightly and securely, as is well-known to those skilled in the art. Obviously there are serious drawbacks and objections in a construction wherein the tire is pressed on to the rim, such as the need for great accuracy in workmanship, and the time, labor, and skill involved in assembling the parts, and in disassembling the same when repairs have to be made. The primary object of my invention is, therefore, to remove the aforesaid drawbacks and objections. The tire is easily removable in the present wheel construction, it being possible to remove, and replace as well, said tire with no other tool than an ordinary wrench.

Another object is, by avoiding the use of bolts which pass through the interior of the wheel, as I am able to do, to economize space within said wheel for the mechanism therein, and even to reduce the outside rim diameter if desired.

Still another object, which also depends upon the absence of bolts that pass through the wheel interior, is the avoidance of leakage through the backside of the wheel, something to which the old construction is subject.

The wheel rim and back disk or plate in this case are integral, which is an advantage over a construction in which such members are separate and independent and bolted or otherwise mechanically joined together. This combined rim and back plate form what may be termed a housing.

A further object is to provide tire-securing means which is strong, tight, durable, and withal practicable and efficient.

Other objects and advantages will appear in the course of the following description.

A preferred embodiment of the invention, whereby I attain the objects and secure the advantages of the same, is illustrated in the accompanying drawings, and I will proceed to describe said invention with reference to said drawings, although it is to be understood that the form, construction, arrangement etc. of the parts in various aspects are not material and may be modified without departing from the spirit of the invention.

Figure 2:
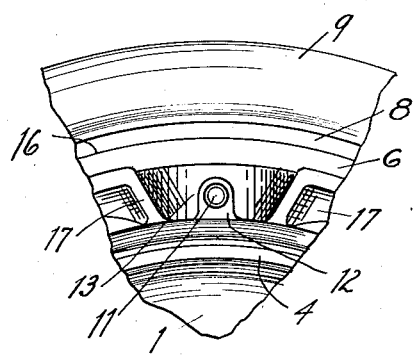
Figure 3:
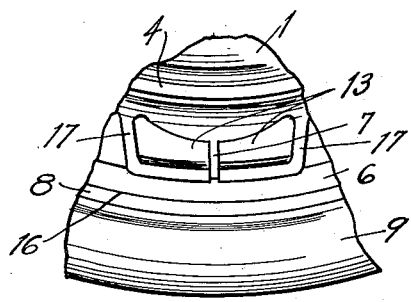

In the drawings, in which like characters of reference designate like parts throughout the several views, Figure 1 is a central, transverse section through a wheel, or so much of the same as is necessary for the present purpose, which embodies my invention as aforesaid; Fig. 2, a fragmentary, rear elevation showing a portion of the flange of the expansion ring by means of which the rubber tire or its band is secured in position, and, Fig. 3, a fragmentary, rear elevation showing the split in said expansion ring.

Referring to the drawings it will be seen that I have illustrated a wheel housing consisting of a back plate 1, which has a reinforced center or hub 2, a forwardly-extending rim 3, and a rearwardly-extending, brake-drum flange 4. Openings 5 are tapped in the hub 3 to receive oil-cups (not shown).

The periphery of the housing rim 3 is tapered from the forward edge rearwardly, and mounted on said rim is a band 16 internally tapered and of a size to fit said periphery. The band 6 is split, as at 7, to permit said band to expand against the inside of a steel base band 8 to which a rubber tire 9 is vulcanized. The expansion is accomplished by means of a series of bolts, 10. Each bolt 10 is received in an opening 11 tapped into the back edge or side of the housing rim 3, after passing through a slot 12 in an inturned, integral flange 13 at the back of the band 6. A plain washer 14 and a lock-washer 15, respectively, are interposed between the flange 13 and each of the heads of the bolts 10. The slots 12 accommodate the flange 13 to the bolts 10, such accommodation being needed on account of the expansion of the band 6 permitted by the presence of the opening 7 in said band, which opening extends through said flange. At the back edge of the band 6, or the backside of the flange 13, is a series of outwardly-extending lips 16 which contact with the rear edge of the band 8, and said flange may be provided on said backside with a plurality of oblique, reinforcing or stiffening ribs 17.

The construction, arrangement, and proportion of the parts are such that the tire band 8 can be slipped on to the expanding band 6 by hand, before the bolts 10 are tightened. After thus placing the band 8 with the tire 9 the same is secured by tightening the bolts 10 and so expanding the band 6. Upon loosening the bolts 10 the tire band 8 can be easily removed by hand. The band 6 is placed on the housing rim 3 from the rear, and the band 6, to which is vulcanized the tire 9, is placed on and removed from said band 6 from the front, as will readily be seen. When the bolts 10 are set up the band 6 is crowded tightly between the rim 3 and the band 6, and at the same time said first-named band is expanded, so that the parts are so securely fastened that accidental displacement is practically impossible. The bolts 10 prevent rearward displacement of the band 6, and the lips 16 prevent rearward displacement of the band 8, and remove a large amount of the strain incident to pressure on the tire 9 toward the backside of said tire, or having a rearward direction as applied to the wheel as a whole, from the contacting, peripheral surfaces of said bands. Although the frictional engagement between the bands 6 and 8 might be depended upon, as a rule, to retain said band 8 in place regardless of the direction of force applied to the tire 9, the lips 16 afford an extra safeguard and provide additional restraining means at points where most required.

The construction of the flange 13 and the arrangement of the ribs 17 are such that the heads of the bolts 10 are out of the way in the recesses provided in part by said ribs, and there is room for the application to such heads of a wrench and for the operation of the latter.

While it might be possible to make the expansible band 6 in sections, it is believed that a one-piece, split member is far more practicable and less expensive.

What I claim as my invention, and desire to secure by Letters Patent, is—

1. The combination, in tire - securing means, with an exteriorly-tapered rim, of an interiorly-tapered expansible band mounted on said rim, and having at its wide edge an inwardly-extending recessed flange, said rim and band at their rear and front edge portions, respectively, being in contact, a tire band mounted on said expansible band, bolts passing through the recessed parts of said flange and tapped into said rim, and washers between said recessed parts and the heads of said bolts, whereby said expansible band is expanded when its flange is forced by said bolts and washers toward said rim.

2. The combination, in tire - securing means, with an exteriorly-tapered rim, of an interiorly-tapered expansible band mounted on said rim, and having at its wide edge an inwardly-extending recessed flange provided with exterior strengthening ribs, and with rib-connecting members that form outwardly-extending lips, said rim and band at their rear and front edge portions, respectively, being in contact, bolts passing through the recessed parts of said flange and tapped into said rim, washers between said recessed parts and the heads of said bolts, whereby said expansible band is expanded when its flange is forced by said bolts and washers toward said rim, said washers and the heads of said bolts, being in the recesses between said ribs, and a tire band on said expansible band in front of said lips.

KARSTEN KNUDSEN.

Witnesses:
 AGNES KNUDSEN,
 JOHN KASTEN.